(12) United States Patent
Torii et al.

(10) Patent No.: US 8,265,350 B2
(45) Date of Patent: Sep. 11, 2012

(54) METHOD AND APPARATUS FOR DETECTING AND PROCESSING SPECIFIC PATTERN FROM IMAGE

(75) Inventors: Kan Torii, Pittsburgh, PA (US); Masakazu Matsugu, Yokohama (JP); Katsuhiko Mori, Kawasaki (JP); Hiroshi Sato, Kawasaki (JP); Yusuke Mitarai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1273 days.

(21) Appl. No.: 11/951,809

(22) Filed: Dec. 6, 2007

(65) Prior Publication Data
US 2008/0212879 A1    Sep. 4, 2008

(30) Foreign Application Priority Data

Dec. 22, 2006 (JP) ................. 2006-346260

(51) Int. Cl.
*G06K 9/00* (2006.01)
*G06K 9/46* (2006.01)
*G06K 9/66* (2006.01)
(52) U.S. Cl. .................. 382/118; 382/165; 382/195
(58) Field of Classification Search .................. 382/118, 382/165, 195
See application file for complete search history.

(56) References Cited

U.S. PATENT DOCUMENTS

| | | | |
|---|---|---|---|
| 7,057,636 B1 * | 6/2006 | Cohen-Solal et al. | 348/14.08 |
| 7,831,067 B2 * | 11/2010 | Le Shiffer et al. | 382/117 |
| 2004/0151371 A1 * | 8/2004 | Chen et al. | 382/165 |
| 2005/0105805 A1 * | 5/2005 | Nicponski | 382/216 |
| 2006/0257026 A1 * | 11/2006 | Shiffer et al. | 382/190 |
| 2006/0257132 A1 * | 11/2006 | Shiffer et al. | 396/158 |
| 2007/0031032 A1 * | 2/2007 | Oh et al. | 382/167 |
| 2008/0107341 A1 * | 5/2008 | Lu | 382/190 |
| 2008/0212879 A1 * | 9/2008 | Torii et al. | 382/195 |
| 2009/0041297 A1 * | 2/2009 | Zhang et al. | 382/103 |
| 2009/0263046 A1 * | 10/2009 | Imai | 382/286 |

FOREIGN PATENT DOCUMENTS

| | | |
|---|---|---|
| JP | 55059585 A | 5/1980 |
| JP | 11-015979 A | 1/1999 |
| JP | 2002-312796 A | 10/2002 |
| JP | 2006-174022 A | 6/2006 |

* cited by examiner

*Primary Examiner* — Aaron W Carter
(74) *Attorney, Agent, or Firm* — Canon USA Inc. IP Division

(57) ABSTRACT

In an image within which a face pattern is detected, when a ratio of a skin color pixel is equal to or smaller than a first threshold value in a first region and a ratio of a skin color pixel is equal to or greater than a second threshold value in a second r region, the vicinity of the first region is determined to be a face candidate position at which the face pattern can exist. Face detection is carried out on the face candidate position. The second region is arranged in a predetermined position relative to the first region.

17 Claims, 17 Drawing Sheets

FIG. 5
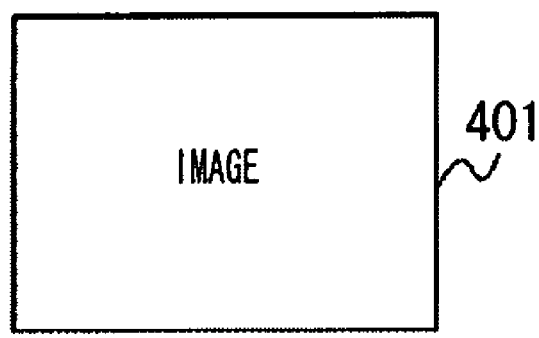
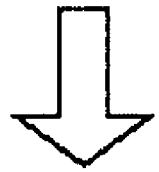
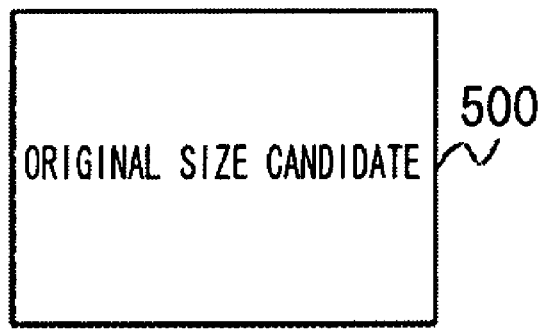
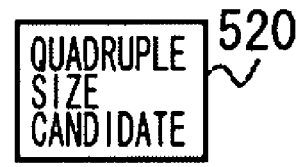

FIG. 17

| CHARACTER TYPE VECTOR | | | | | | | | | DISCRIMINATOR |
|---|---|---|---|---|---|---|---|---|---|
| 0 | 0 | 0 | 0 | 0 | 0 | 0 | 0 | 0 | NONE |
| ... | | | | | | | | | |
| 0 | 0 | 0 | 1 | 0 | 0 | 0 | 0 | 1 | A |
| 0 | 0 | 0 | 1 | 0 | 0 | 0 | 1 | 0 | B |
| 0 | 0 | 0 | 1 | 0 | 0 | 0 | 1 | 1 | A |
| 0 | 0 | 0 | 1 | 0 | 0 | 1 | 0 | 0 | C |
| 0 | 0 | 0 | 1 | 0 | 0 | 1 | 0 | 1 | D |
| ... | | | | | | | | | |
| 1 | 1 | 1 | 1 | 1 | 1 | 1 | 1 | 1 | NONE |

METHOD AND APPARATUS FOR DETECTING AND PROCESSING SPECIFIC PATTERN FROM IMAGE

BACKGROUND OF THE INVENTION

1. Field of the Invention

The present invention relates to an image processing method and apparatus for performing processing such as image recognition or image transformation.

2. Description of the Related Art

When image processing is applied to an image, the processing may be performed on only a selected part of the image. Alternatively, as the case may be, each region of the image can be subjected to a different image processing operation. In either case, it is necessary to determine which region of an image is to be processed using a given process operation.

In various software applications, a user can select a region of an image where an image processing is to be performed. For example, in an image editing application, such as Photo Editor® of Microsoft Corporation, a user can specify a region to be processed using a mouse prior to applying image processing such as negative/positive inversion to the image.

Alternatively, some of the image recognition methods carry out refining of a candidate region by a filtering process having a light processing load before starting a recognition process that causes a heavy processing load. In "HMM-based Sign Language Recognition using Hand Gesture and Hand Posture" (Yanagi, Yagyu, Tokuda, Kitamura, Proceedings of the Institute of Electronics, Information and Communication Engineers (IEICE) General Conference (Vol. 2004)), a skin color region in an image is extracted, a center point of a continuous skin color region is defined as a candidate position, and then, a hand posture can be obtained.

On the other hand, there is a pattern recognition method in which all portions where skin color pixels exist are defined as candidate positions, as discussed in Japanese Patent Application Laid-open No. 2002-312796. In this method, high precision pattern detection is carried out after the candidate position is obtained. There are a variety of methods for obtaining the skin color pixels, some of which are discussed in "Analysis of Human Skin Color Images for a Large Set of Color Spaces and for Different Camera Systems", (Terrillon, Pilpre, Niwa, Yamamoto, IAPR Workshop on Machine Vision Applications (MVA 2002)), for example.

In the conventional technique described above, a user is to specify a region to which image processing is applied. Such a method is effective in many cases where it is desired to reflect the user's intention. However, this method is not suitable in a case where automatic sensing is desired as in image recognition.

Further, in a case where a hand is detected, if only one point in a continuous skin color region is defined as a hand candidate position, it is highly probable that detecting of a hand will fail. This is because a natural image generally has a skin color pixel also in a portion other than a hand, and if there is a skin color pixel around a hand, the position of a candidate point may be shifted depending on a distribution state of skin colors.

On the other hand, if all portions where skin color pixels exist are defined as face candidate positions, refining of the face candidate positions is often not effectively carried out. In particular, in the case where there is a wall of a single color similar to a skin color, an entire surface of the wall is defined as a face candidate position. Consequently, face detection processing is frequently executed, which is not preferable from the viewpoint of a processing speed.

Therefore, a method is desired which refines candidates more effectively than conventional methods.

SUMMARY OF THE INVENTION

An embodiment of the present invention is directed to a pattern detection method and apparatus operating with high precision and good processing efficiency.

According to an aspect of the present invention, an embodiment is directed to a method including determining a ratio of a pixel having a first attribute in a first region of an image to generate a first determination result, determining a ratio of a pixel having a second attribute in a second region of the image to generate a second determination result. The second region is arranged in a predetermined position relative to the first region. The method further includes determining whether a predetermined pattern can exist in the vicinity of the first region based on the first determination result and the second determination result, and detecting the pattern in the vicinity of the first region when it is determined that the predetermined pattern can exist.

According to another aspect of the present invention, an embodiment is directed to a method including determining a ratio of a pixel having a predetermined attribute within each figure with respect to one or more figures including a rotationally symmetric figure in an image, determining whether a predetermined pattern can exist in the vicinity of the figure based on a result of the ratio determination, and detecting the predetermined pattern and a pattern obtained by rotating the predetermined pattern in a portion of the image where it is determined that the predetermined pattern can exist.

According to yet another aspect of the present invention, an embodiment is directed to an apparatus including a first ratio determination unit configured to determine a ratio of a pixel having a first attribute in a first region of an image, a second ratio determination unit configured to determine a ratio of a pixel having a second attribute in a second region of the image that is arranged in a predetermined position relative to the first region, a determination unit configured to determine whether a predetermined pattern can exist in the vicinity of the first region based on determination results of the first and second ratio determination units, and a detection unit configured to detect the pattern in the vicinity of the first region when it is determined that the predetermined pattern can exist.

According to yet another aspect of the present invention, an embodiment is directed to an apparatus including a ratio determination unit configured to determine a ratio of a pixel having a predetermined attribute within each figure with respect to one or more figures that include a rotationally symmetric figure in an image, a determination unit configured to determine whether a predetermined pattern can exist in the vicinity of the figure based on a result of the ratio determination, and a detection unit configured to detect the predetermined pattern and a pattern obtained by rotating the predetermined pattern in a portion of the image where it is determined that the predetermined pattern can exist.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 is a view illustrating a format of face candidate position information according to the first embodiment of the present invention.

FIG. 17 is a diagram illustrating a lookup table to be referred to during operational procedures for character recognition according to the second embodiment of the present invention.

DETAILED DESCRIPTION OF THE EMBODIMENTS

Various exemplary embodiments, features, and aspects of the invention will be described in detail below with reference to the drawings.

First Exemplary Embodiment

The first embodiment of the present invention illustrates an information processing apparatus for examining images stored in a database and finding images that include a predetermined pattern, such as a human face image.

Figure 1:
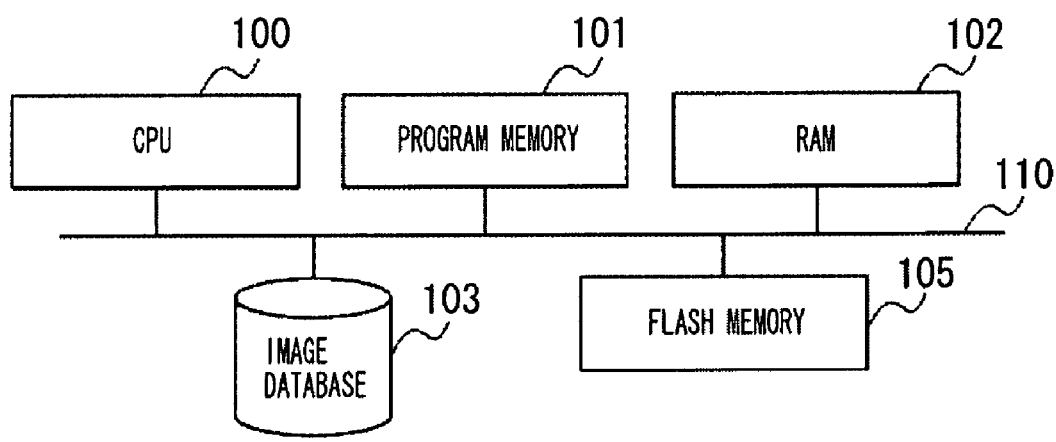
FIG. 1 is a block diagram illustrating a hardware configuration of an information processing apparatus according to a first embodiment of the present invention.

FIG. 1 is a block diagram illustrating a hardware configuration of an information processing apparatus according to the first embodiment of the present invention. A central processing unit (CPU) 100 executes an image processing method described in the present embodiment in accordance with a program. A program memory 101 stores programs executed by the CPU 100. A random access memory (RAM) 102 is a memory for temporarily storing a variety of information when the CPU 100 executes a program.

A hard disk 103 stores files such as an image file. The CPU 100 can read or write information from or to a flash memory 105. The flash memory 105 is detachable so that a user can carry information written in the memory. A bus 110 is configured to interconnect these units and deliver data or a control signal. In addition, the information processing apparatus can include an input device such as a keyboard or a pointing device, and a display device.

Figure 2:
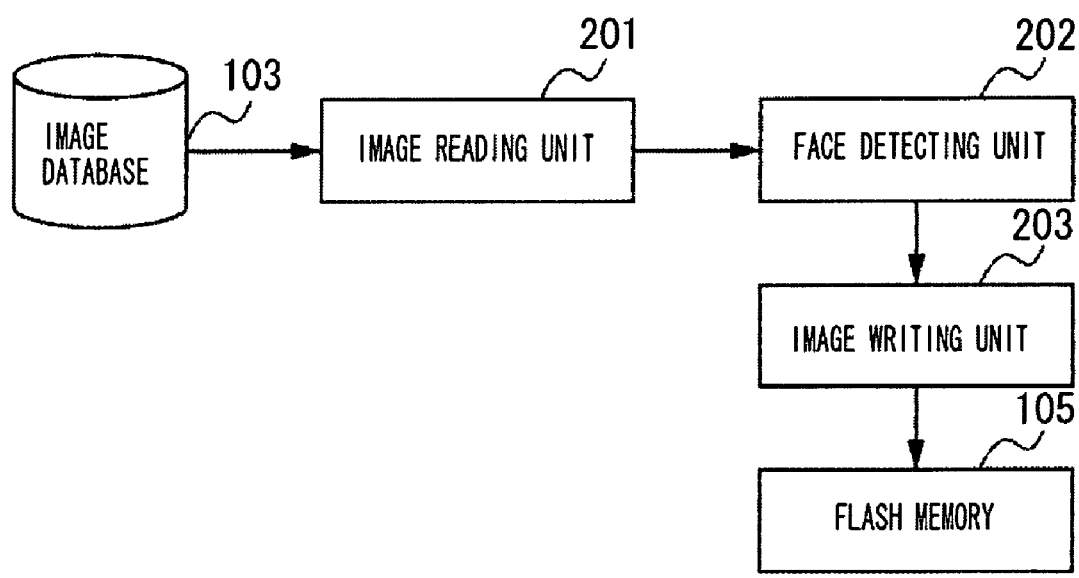
FIG. 2 is a block diagram illustrating a functional configuration of the information processing apparatus according to the first embodiment of the present invention.

FIG. 2 is a block diagram illustrating a functional configuration of the information processing apparatus according to the first embodiment. In an embodiment, the illustrated functions are implemented by the CPU 100 executing a program. For the sake of explanation, suppose that some of the image files stored in the hard disk 103 include photographed faces and some images do not include photographed faces. In addition, photographed faces included in some of the images are inclined and other photographed faces are not inclined.

Each image file is stored in the RAM 102 by an image reading unit 201. A face detecting unit 202 detects whether a face exists in an image written in the RAM 102. An image writing unit 203 writes into the flash memory 105 the image written in the RAM 102.

Figure 3:
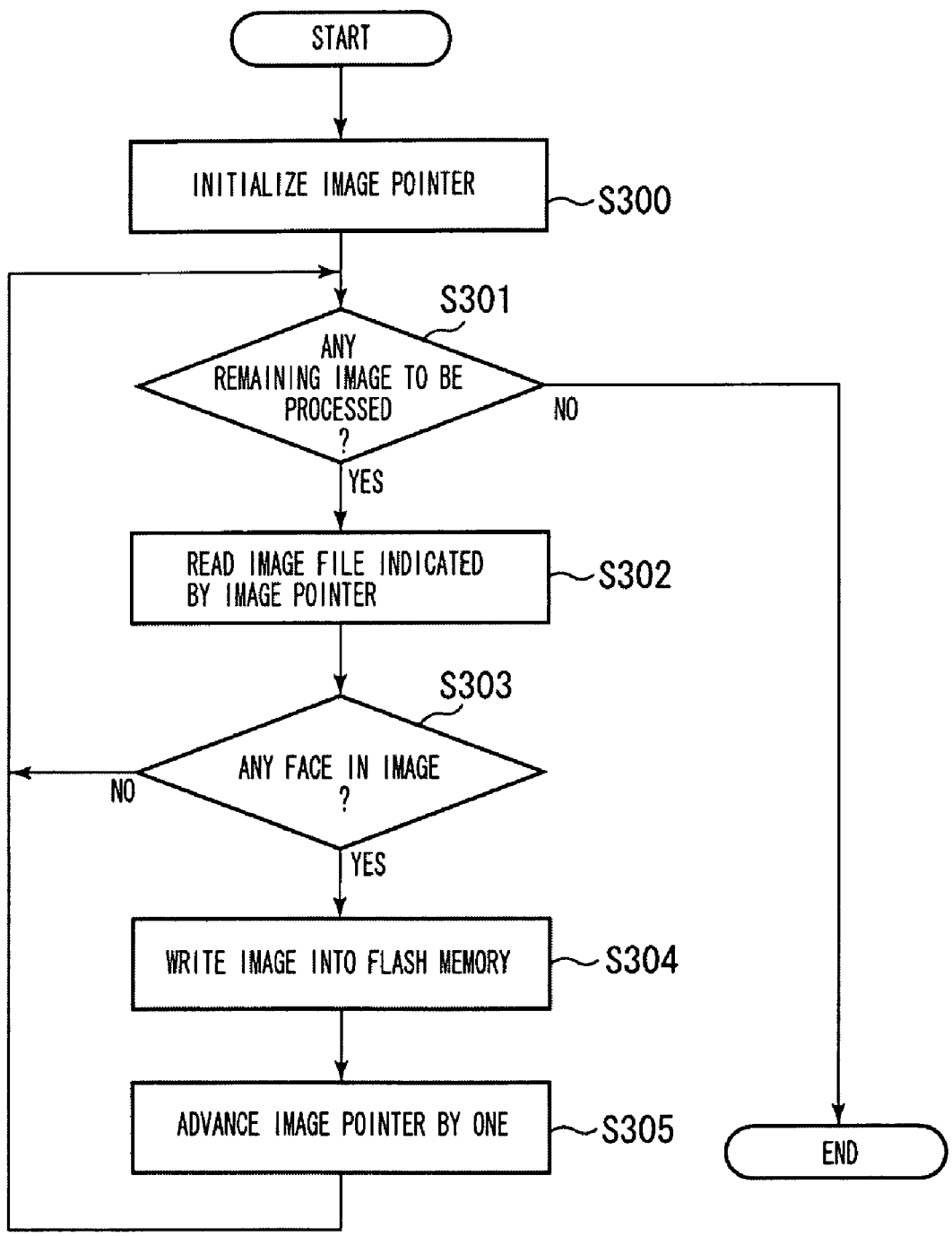
FIG. 3 is a flow chart illustrating processing of selecting and copying an image including a face, according to the first embodiment of the present invention.

FIG. 3 is a flow chart illustrating a process of selecting an image including a face from images stored in the hard disk 103, and then, copying the selected image to the flash memory 105.

First, in step S300, the CPU 100 initializes an image pointer so that the image pointer points a first image. The image pointer is a variable for sequentially pointing the image files stored in the hard disk 103.

In next step S301, the CPU 100 determines whether an image to be processed remains in the hard disk 103. If any images remain (YES in step S301), loops up to step S303 or S305 are executed. On the other hand, if all images have been already processed (NO in step S301), the process ends.

In step S302, the CPU 100 reads into the RAM 102 an image indicated by an image pointer at the time. Then, in step S303, the CPU 100 determines whether a face is included in the read image. A method of determination will be described later. If it is determined that no face is included in the read image (NO in step S303), the process returns to step S301. If it is determined that a face is included in the read image (YES in step S303), the process proceeds to step S304.

In step S304, the CPU 100 writes into the flash memory 105 the image read into the RAM 102. Then, in step S305, the CPU 100 advances the image pointer by one stroke so as to point a next image file. When step S305 is performed, the process returns to step S301.

Figure 4:
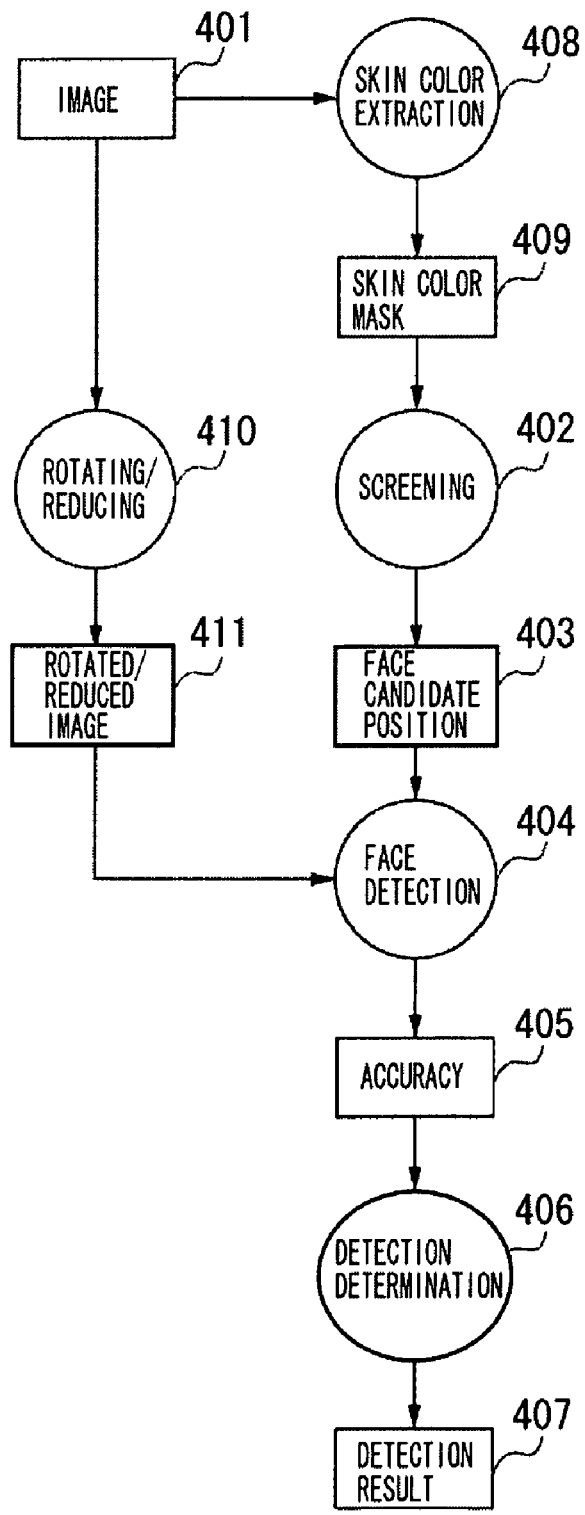
FIG. 4 is a diagram illustrating a data flow of carrying out face detection according to the first embodiment of the present invention.

FIG. 4 illustrates a data flow when face detection is carried out in step S303 of FIG. 3. A skin color extraction processing 408 determines whether pixels of an image 401 read into the RAM 102 are skin color and creates a binary image of a skin color mask 409. With respect to skin color extraction processing, various methods are described in "Analysis of Human Skin Color Images for a Large Set of Color Spaces and for Different Camera Systems".

In screening 402, a position at which a face is likely to exist in the image 401, is determined using the skin color mask 409. The result of the determination is written into face candidate position information 403. The screening 402 will be described below in detail. The contents of the face candidate position information 403 will be described below with reference to FIG. 6.

In face detection processing 404, it is determined whether a face exists at the corresponding portion of the image 401 based on the face candidate position information 403. Then, the result is written in probability information 405. A format of probability information 405 will also be described below.

Rotation/reduction 410 of the image 401 is carried out in order to detect faces of a plurality of inclinations or sizes by one type of detection processing. The result is stored as a rotated/reduced image 411. Face detection processing 404 uses the rotated/reduced image 411.

Detection determination processing 406 determines whether a face exists in the image 401, referring to the probability information 405. In the case where there is probability exceeding a given threshold value, information "present" is written as next detection result information 407. Otherwise, "None" is written as detection result information 407.

In the present embodiment as described above, the screening processing 402 is performed before the face detection processing 404, thereby reducing the number of times that the face detection processing 404 with comparatively heavy calculation load is executed.

FIG. 5 illustrates a conceptual view of a format of the face candidate position information 403 in FIG. 4. In the present embodiment, it is assumed that the face detection unit 202 deals with face inclinations of 0 degrees, 90 degrees, 180 degrees, and 270 degrees and face sizes of original, double, and quadruple. When a face size is original, it refers to a minimal face size. In actuality, it indicates that a face width is 30 pixels, for example. When the face size is double, it refers to a face width of 60 pixels. In the present specification, a specific face size is not relevant to the actual nature of the invention, and thus, the face size is represented by magnification so as to simplify a size ratio.

Image 401 is illustrated for reference. Candidate position information 500, 510, and 520 are the contents of the face candidate position information 403. Each of the candidate position information 500, 510, and 520 is in a binary two-dimensional array, and is rasterized in the RAM 102. One point of each two-dimensional array corresponds to one point of the image 401 on a one by one basis, and indicates whether a face of a predetermined size is likely to exist in a neighboring region of such one point. Namely, the above one point indicates whether it is necessary to apply the face detection processing 404 of FIG. 4 to that region.

Candidate 500 is candidate position information relating to a face which size is original, and information about whether a face of an original size is likely to exist in a region of the image 401, is stored in corresponding elements of two-dimensional array. For example, one point (x, y) of the candidate position information 500 of the original size indicates whether a face of the original size is likely to exist within a square which is defined with a diagonal line of coordinates (x−s/2, y−s/2) and (x+s/2, y+s/2) on the image 401. The lowercase letter "s" denotes an arbitrary width and a parameter that is adjusted in an operation.

Similarly, the candidate 510 refers to candidate position information relating to a face which size is double, and the candidate 520 refers to candidate position information relating to a face which size is quadruple. In FIG. 5, a dimension of candidate position information relating to a face which size is double or quadruple is ½ times or ¼ times that of candidate position information relating to a face which size is original. This is because, even if a position of face which size is double is shifted by one pixel or even if a position of a face which size is quadruple is shifted by three pixels, no significant problem occurs in terms of precision.

Therefore, in the screening processing 402 of FIG. 4, with respect to the face size of double, a determination whether the face is likely to exist, is made every two pixels, and with respect to a face size of quadruple, a determination whether a face is likely to exist, is made every four pixels. A determination can be made also for all of the pixels in order to obtain position information with higher precision. What is important here, is that each candidate position information does not depend on face inclination. Namely, it is determined at one time whether faces of which inclination is 0 degrees, 90 degrees, 180 degrees, and 270 degrees are likely to exist.

Figure 6:
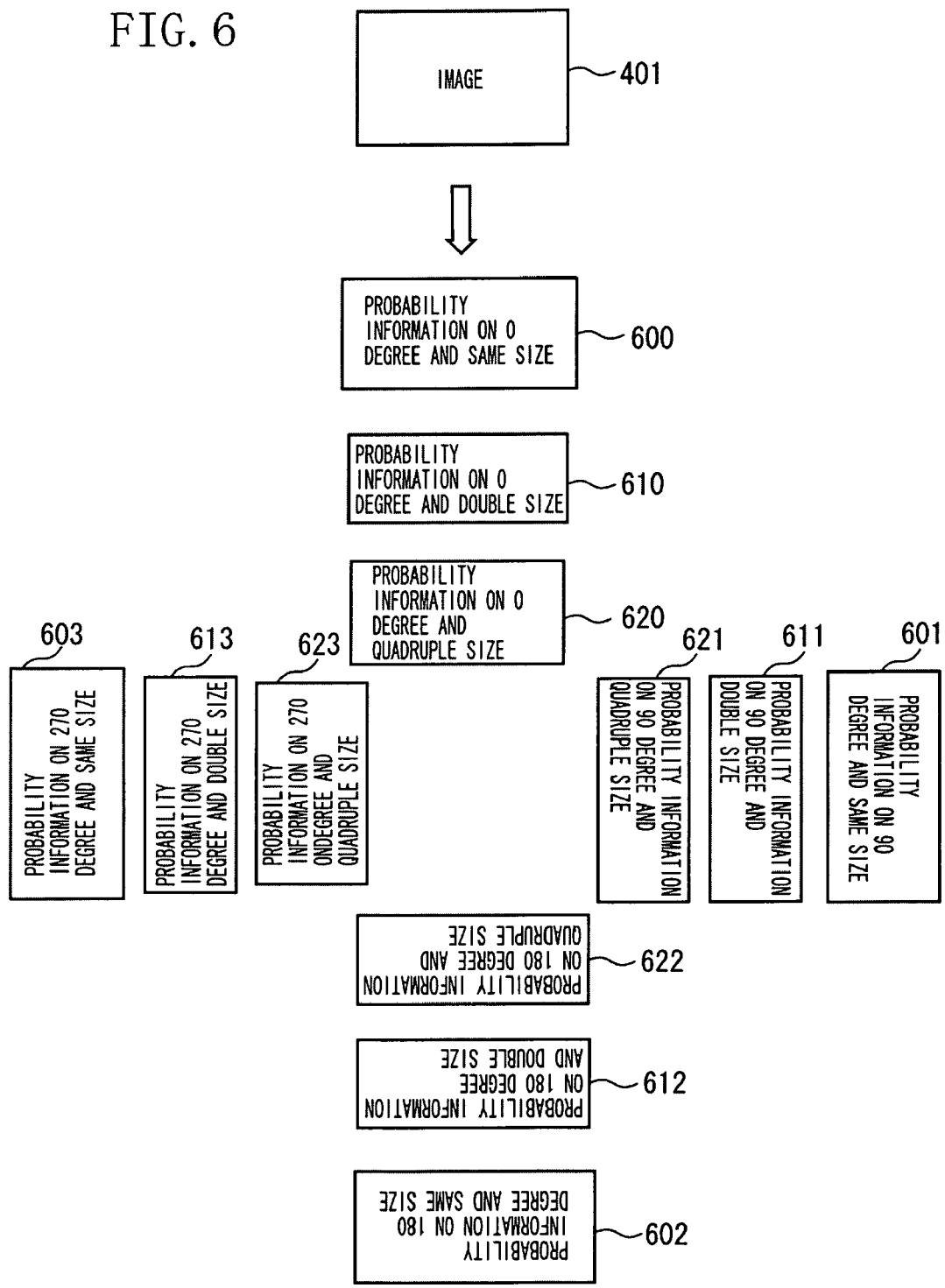
FIG. 6 is a view illustrating a format of probability information according to the first embodiment of the present invention.

FIG. 6 illustrates a conceptual view of a format of the probability information 405. The image 401 is illustrated for reference. Items of probability information 600 through 623 show the contents of the probability information 405. The probability information 600 is directed to a face of which inclination is 0 degrees and face size is original. The probability that a face of 0 degrees in inclination and original in size exists in a corresponding region of the image 401, is stored in each element of two-dimensional array.

Similarly, the probability information 601 is directed to a face of which inclination is 90 degrees and size is original; the probability information 602 is directed to a face of which inclination is 180 degrees and size is original; and the probability information 603 is directed to a face of which inclination is 270 degrees and size is original. The probability information 610 is directed to a face of which inclination is 0 degrees and size is double; the probability information 611 is directed to a face of which inclination is 90 degrees and size is double; and the probability information 622 is directed to a face of which inclination is 180 degrees and size is quadruple. The same also applies for the probability information 612, 613, 620, 621, and 623.

In FIG. 6, the dimension of probability information relating to a face which size is double or quadruple is ½ times or ¼ times that of probability information relating to a face which size is original. This is because a face which size is double or quadruple is discriminated by the same discriminator while the image 401 is reduced. In the present embodiment, if a reduced image is entered, the discriminator outputs probability information whose dimension is correspondingly smaller.

Items of the probability information 600 through 623 are two-dimensional arrays, and are rasterized on the RAM 102. One point of each two-dimensional arrays corresponds to a region of the image 401, and represents a probability that a face of a predetermined inclination/size exists in that region. For example, one point (x, y) of the probability information 600 of 0 degrees and original size represents a probability that a face of 0 degrees and the same size exists within a rectangle which is defined with a diagonal line of (x−w/2, y−h/2) and (x+w/2, y+h/2) on the image 401. The lowercase letter "w" denotes a face width of original size, and the lowercase letter "h" denotes a face height of original size.

In addition, one point (x, y) of probability information of 90 degrees and n times represents a probability that a face of 90 degrees and n times exists within a rectangle which is defined with a diagonal line of coordinates (n(y−h/2), H−n (x+w/2)) and (n(y+h/2), (H−n(x−w/2)) on the image 401. The "W" denotes the width of the image 401, and "H" denotes the height of the image 401. Similarly, one point (x, y) of probability information of 180 degrees and n times represents a probability that a face of 180 degrees and n times exists within a rectangle which is defined with coordinates (W−n(x+w/2), H−n(y+h/2)) and (W−n(x−w/2), H−n(y−h/2)) on the image 401. The same also applies to a face of 270 degrees and n times.

Before describing screening 402 in detail, first, the concept of cumulative images will be described. What is referred to as cumulative images is summed-region table introduced by Crow (Crow, "Summed-area Tables For Texture Mapping", Computer Graphics, Vol. 18, No. 3, 1984) that is applied to a binary image in the present embodiment. When a value of a binary image at one point (x, y) is I(x, y), a value S(x, y) of cumulative images at one point (x, y) is represented by a formula (1) below.

$$S(x, y) = \sum_{\substack{x' \leq x \\ y' \leq y}} I(x', y') \quad (1)$$

where S(x, y)=0 when x<0 or y<0. If cumulative images are thus defined, the number S $(x_0, y_0; x_1, y_1)$ of "1"s within a rectangle on a binary image in which $(x_0, y_0)$ is a top left apex and $(x_1, y_1)$ is a bottom right apex, is represented by a formula (2) below.

$$S(x_0,y_0;x_1,y_1)=S(x_0-1,y_0-1)-S(x_0-1,y_1)-S(x_1,y_0-1)+S(x_1,y_1) \quad (2)$$

If cumulative images are prepared in advance, the number of "1"s within an arbitrary rectangle can be obtained merely with reference to 4 points within cumulative images.

Figure 7:
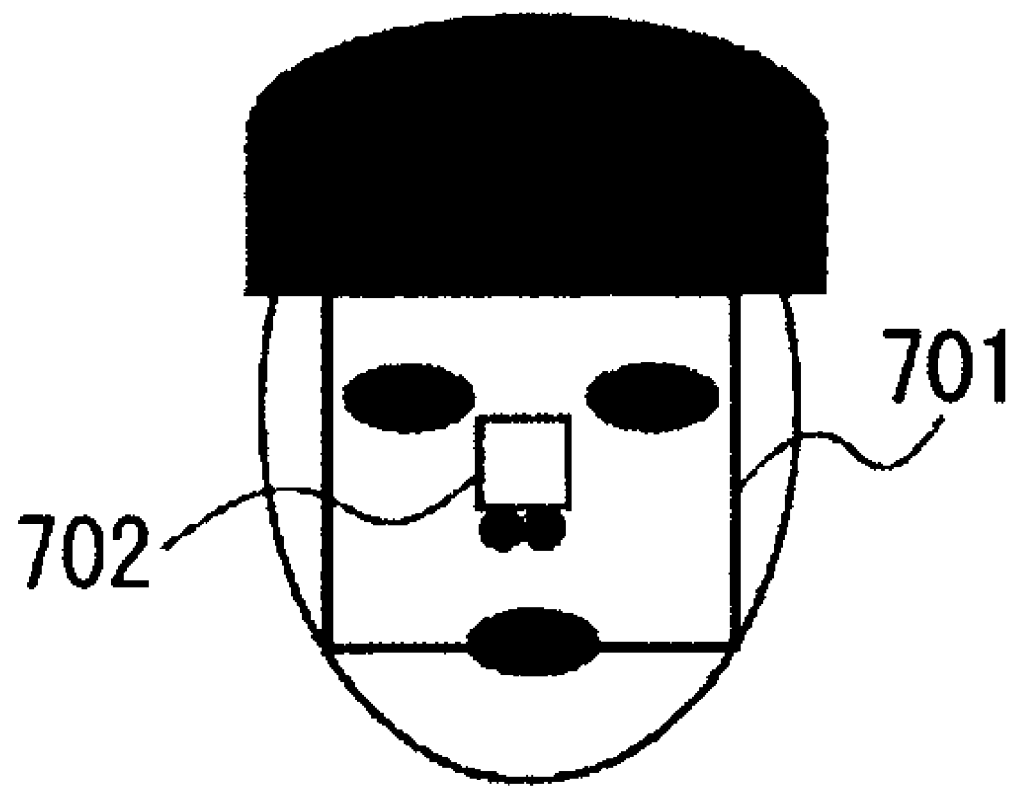
FIG. 7 is a view illustrating a relationship between a large rectangle and a small rectangle in screening according to the first embodiment of the present invention.

Next, the screening 402 will be described in detail. A basic concept in screening is illustrated in FIG. 7. With respect to a face within an image, a large rectangle 701 including eyes and a small rectangle 702 that does not include eyes or noses are prepared as illustrated in FIG. 7. Then, it can be considered that the large rectangle 701 includes a non-skin color pixel and the inside of the small rectangle 702 mostly shows a skin color. In this case, the large rectangle 701 and small rectangle 702 are squares which have centers coincident with each other.

For example, the skin color mask 409 is scanned under a condition that a skin color pixel ratio in the large rectangle 701 is $t_L$ or less and a skin color pixel in the small rectangle 702 is $t_S$ or more. For example, $t_L$=0.7 and $t_S$=0.9. Then, a face candidate position can be obtained where the condition is met. The screening 402 is designed under the concept as described above.

Figure 8:
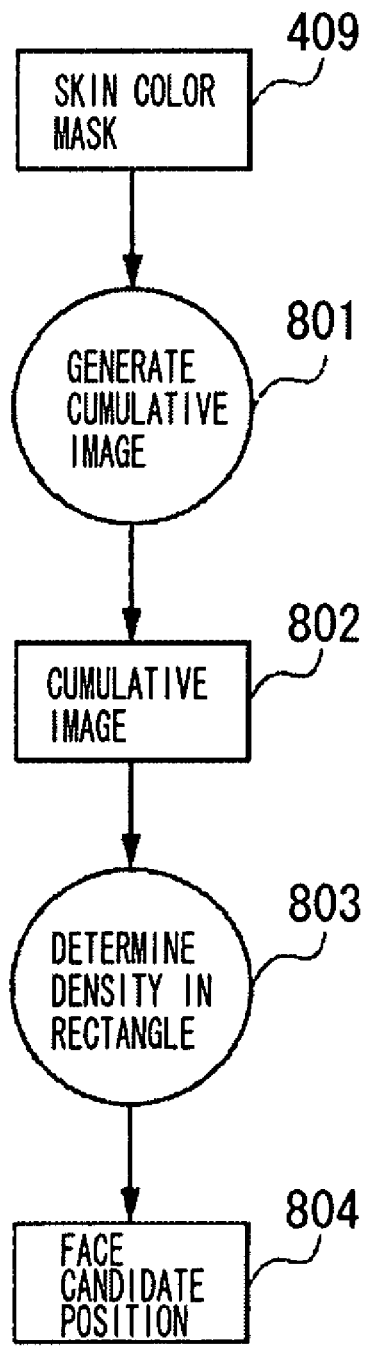
FIG. 8 is a diagram illustrating a detailed data flow of screening according to the first embodiment of the present invention.

FIG. 8 is a data flow diagram illustrating the screening 402 in detail. First, cumulative image generation processing 801 generates a cumulative image 802 in accordance with definition of the formula (1) from the skin color mask 409. Next, intra-rectangle density determination processing 803 checks density (proportion) of skin color pixels within a rectangle by the cumulative image 802, and writes the result into face candidate position information 403. The intra-rectangle density determination 803 will be described below in detail.

Figure 9:
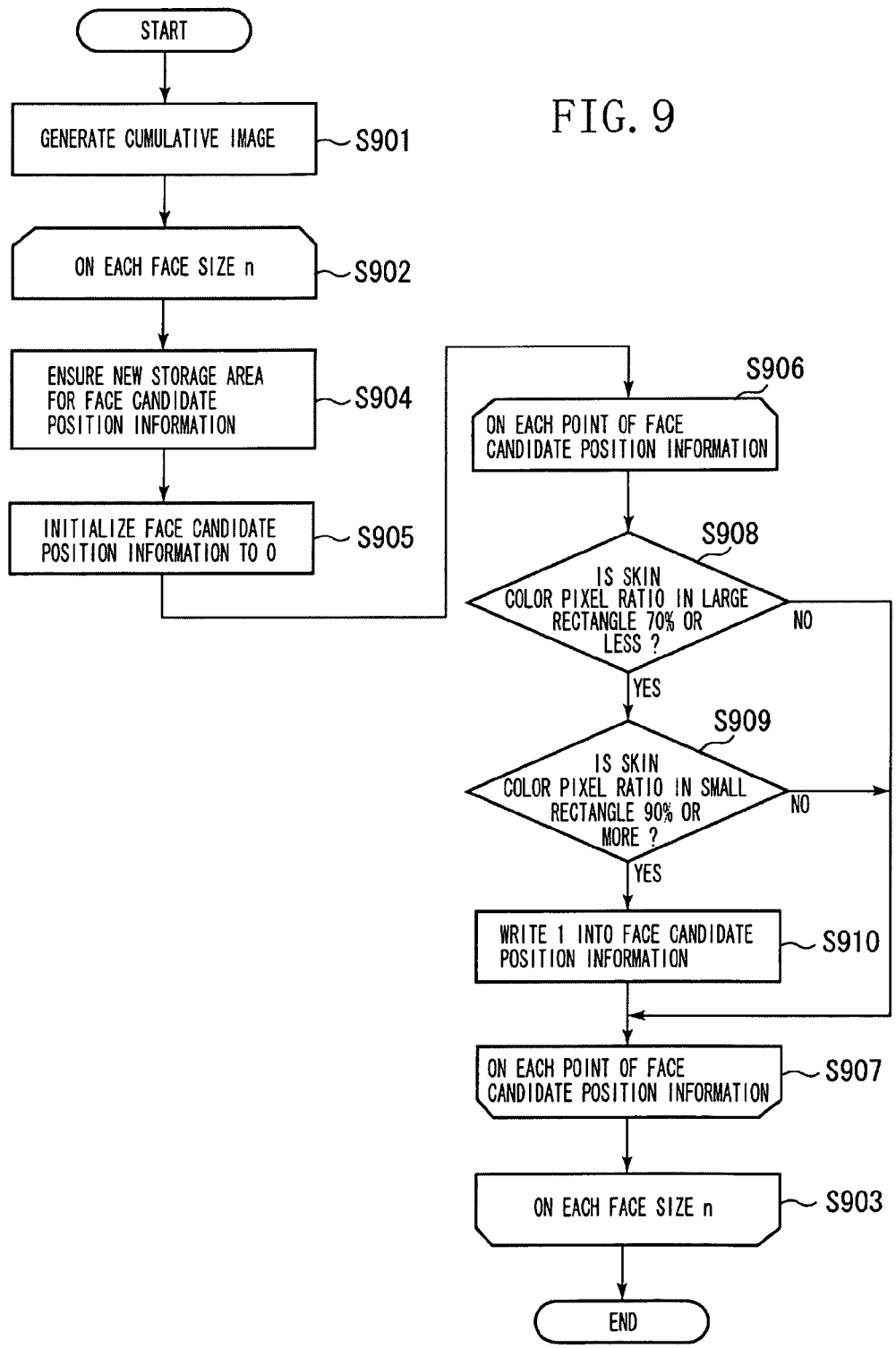
FIG. 9 is a flow chart illustrating operational procedures for screening according to the first embodiment of the present invention.

FIG. 9 is a flow chart illustrating operational procedures for the screening 402. First, in step S901, the CPU 100 generates cumulative images using the formula 1 for defining cumulative images. Only one cumulative image will suffice. Next, the process enters a loop from step S902 through S903. This loop sets a value to "n" with respect to each face size, and a loop is repeated. In the present embodiment, the values "1", "2", and "4" are set with respect to "n". These values must be adjusted depending on a face size to be detected.

Next, in step S904, the CPU 100 secures a storage region for the face candidate position information 403. The contents of face candidate position information 403 were already described with reference to FIG. 5. Then, in step S905, the CPU 100 initializes face candidate position information to 0. Next, the CPU 100 repeats a loop from steps S906 to S907 with respect to points of the face candidate position information 403.

If the width/height of the large rectangle is SL and the width/height of the small rectangle is SS, the large rectangle of the image 401 corresponding to point (x, y) of the face candidate position information is a square which is defined with a diagonal line connecting (n(x−SL/2), n(y−SL/2)) and (n(x+SL/2), n(y+SL/2)). In addition, the small rectangle of the image 401 corresponding to point (x, y) is a square which is defined with a diagonal line connecting (n(x−SS/2), (y−SS/2)) and (n(x+SS/2), n(y+SS/2)). The number of ski color pixels in each of these rectangles is obtained by the formula (2) as described above.

In step S908, the CPU 100 determines whether a ratio of a skin color pixel in the large rectangle is 70% or less. In next step S909, the CPU 100 determines whether a ratio of skin color pixel in the small rectangle is 90% or more. When both of these conditions are met, the CPU 100 writes "1" into point (x, y) of the face candidate position information 403 in step S910. As described above, refining of face candidate positions is carried out in the screening 402, and the result is written into the face candidate position information 403.

The face detection processing 404 determines whether a face exists in the vicinity of a point of the image 401 corresponding to a portion where "1" is written in the generated face candidate position information 403. The rotated/reduced image 411 is utilized for this determination. For example, if the value of point (x, y) in probability information of r degrees and n times is "1", the image 401 is rotated at r degrees, and reduced to 1/n times in the rotation/reduction processing 410. In the face detection processing 404, it is determined whether a face exists within a rectangle which is defined with a diagonal line connecting (x−w/2, y−w/2) and (x+w/2, y+w/2) of the rotated/reduced image 411 that is obtained as the result of rotation/reduction processing 410. The result is written into the probability information 405.

There is a variety of methods for achieving the face detection processing 404. For example, there are neutral networks proposed in "Robust Face Detection System based on Conventional Neutral networks Using Selective Activation of Modules" (Yusuke Mitarai, Katsuhiko Mori, Masakazu Matsugu; Forum on Information Technology (FIT), 2003).

As described above, according to the configuration of the present embodiment, a face candidate region can be refined at a high speed by checking the densities of skin color pixels that exist in two rectangles, on a skin color mask generated by extracting a skin color. As a result, execution of subsequent face detection processing is restrained, and an entire processing speed can be increased.

In addition, by using squares as two rectangles and aligning respective center points, face candidate positions of a plurality of inclinations can be refined by one scan and higher speed processing can be achieved. Moreover, high speed processing of density calculation is achieved by using cumulative images at the time of calculating the density of a skin color pixel.

While the present embodiment is directed to an information processing apparatus corresponding to face inclinations of 0 degrees, 90 degrees, 180 degrees, and 270 degrees, a restriction on a pattern for screening processing can be loosened in the case where only one of inclinations needs to be dealt with. More specifically, no need exists for 4 times-rotation symmetric patterns. Instead, rectangles, other polygons, and an ellipse can be used. In addition, center points of the respective patterns do not need to be aligned.

In the above embodiments, a skin color pixel ratio has been employed in the screening processing. However, chromaticity, luminance, hue, chroma saturation, and brightness can also be employed as attribute values for calculating a pixel proportion.

Second Exemplary Embodiment

A second exemplary embodiment of the present invention is directed to an information processing apparatus in which character recognition is carried out with respect to a specified binary image, and a character code of one character within an image is stored on a memory. A flash memory 105 is excluded from a hardware configuration of the information processing apparatus according to the present exemplary embodiment in contrast to the exemplary embodiment in FIG. 1. However, alternatively, the hardware can be configured to be identical to the first exemplary embodiment illustrated in FIG. 1. The second exemplary embodiment is different from the first exemplary embodiment in that a result of character recognition is also stored in the RAM 102.

Figure 10:
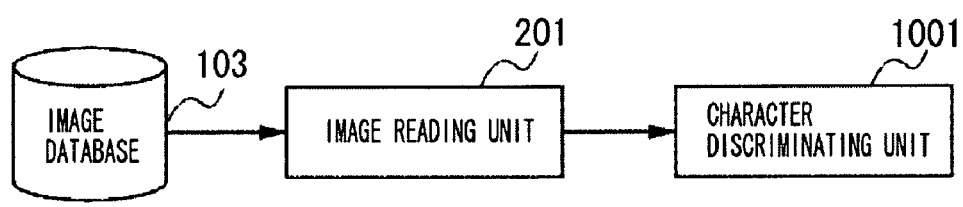
FIG. 10 is a block diagram illustrating a functional configuration of an information processing apparatus according to a second embodiment of the present invention.

FIG. 10 is a block diagram illustrating a functional configuration of the information processing apparatus according to the present embodiment. These functions are implemented by the CPU 100 executing a program. Some of the image files stored in the hard disk 103 include photographed characters and some do not include photographed characters. The respective image files are stored in the RAM 102 by image reading unit 201. If a character exists in the image written into the RAM 102, a character discriminating unit 1001 discriminates that character. Then, the discrimination result is written into a predetermined address of the RAM 102.

Figure 11:
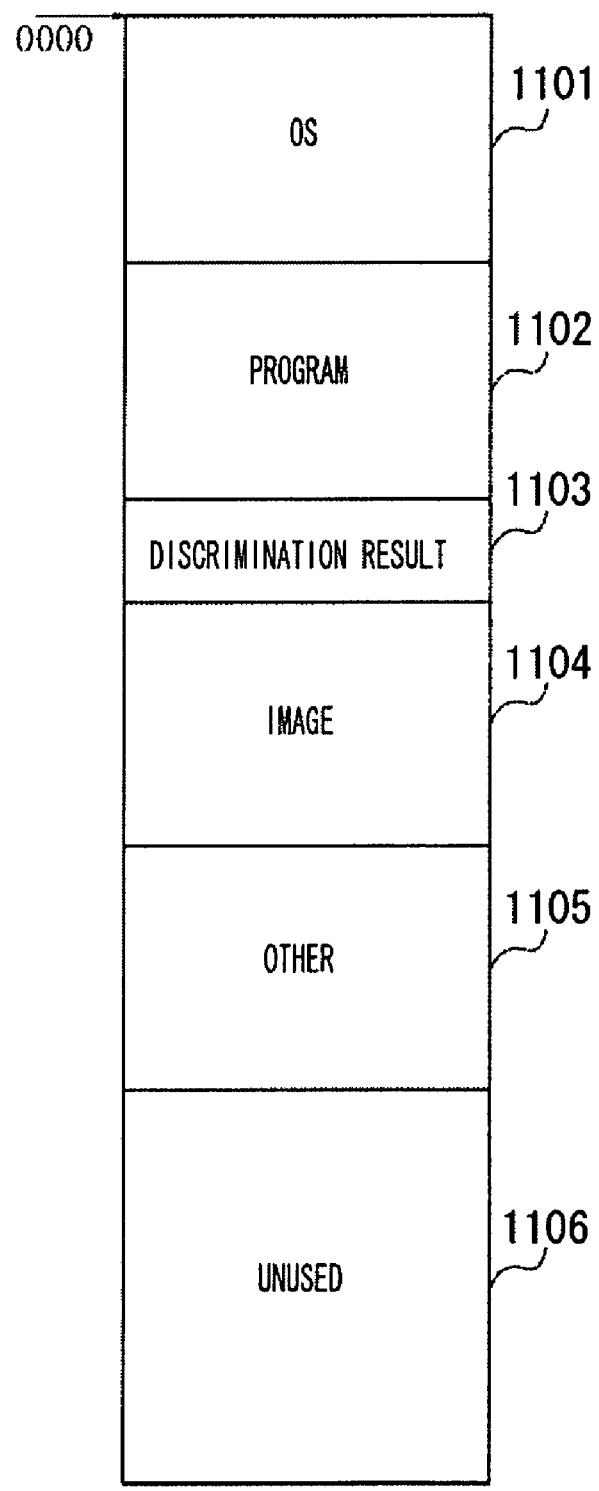
FIG. 11 is a view illustrating a memory map configuration of RAM according to the second embodiment of the present invention.

FIG. 11 is a view illustrating a memory configuration of the RAM 102. An operating system (OS) of this information processing apparatus is placed in a region 1101. A program of the present exemplary embodiment is placed in a region 1102. The character discriminating unit 1001 writes the discrimination result into a region 1103. The image reading unit 201 writes an image into a region 1104. A region 1105 is used for purposes other than the above described. A region 1106 is an unused region.

In an actual apparatus, the sequential order of the above described areas may be changed from that in FIG. 11 depending on the specification of the operating system. In addition, the size of each region in the figure does not reflect the size of an actual memory region.

Figure 12:
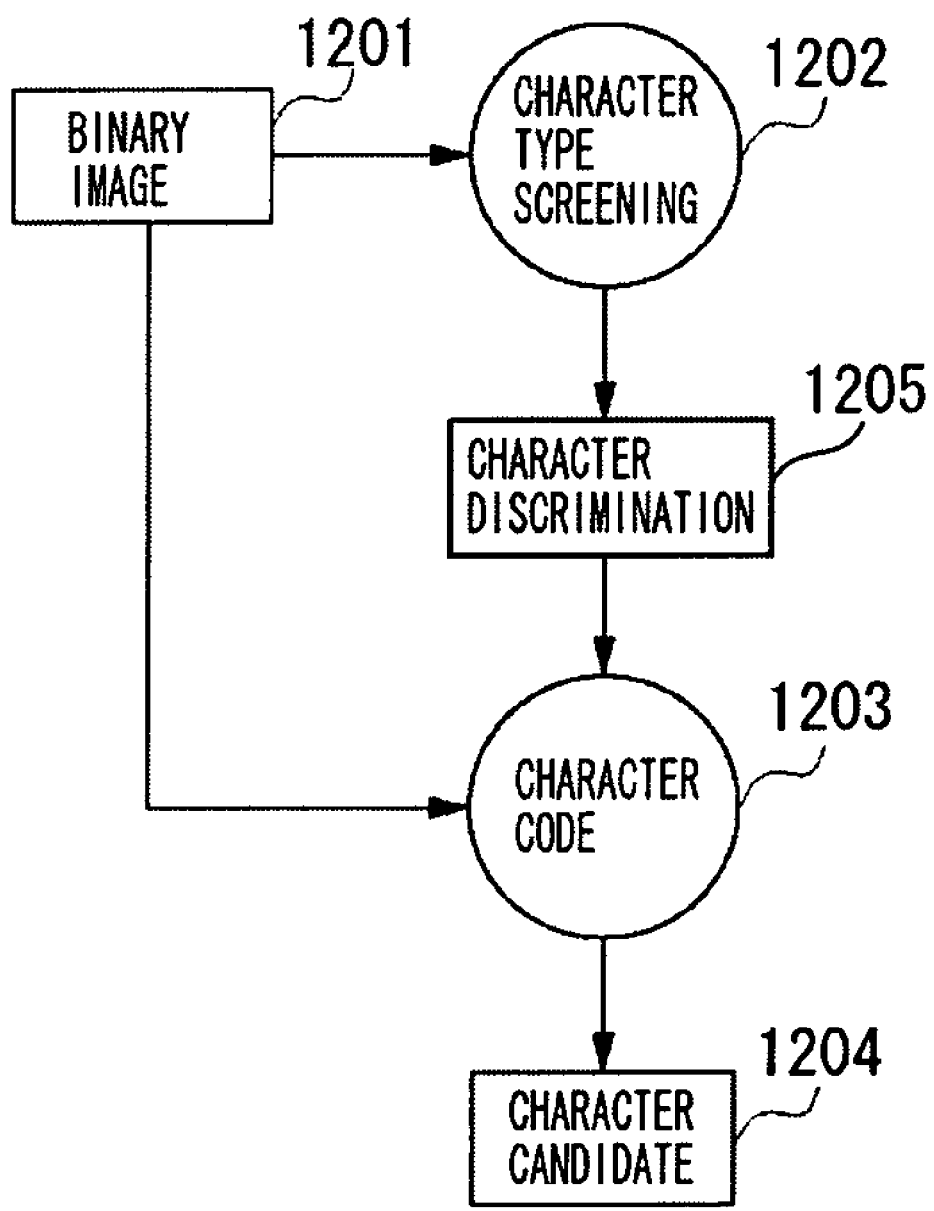
FIG. 12 is a view illustrating a data flow of carrying out character recognition according to the second embodiment of the present invention.

FIG. 12 is a data flow chart at the time of carrying out character discrimination in character discriminating unit 1001. A binary image 1201 is stored in the RAM 102, and "0" or "1" can be taken as a value of each element of a binary image. Hereinafter, a value of "1" of a binary image is referred to as a character color. However, even in a case where a value of "0" is referred to as a character color, similar advantageous effect can also be achieved.

Character type screening 1202 picks up a position where a character is likely to exist from among images 1201, and its type is roughly classified. Character type screening will be described below in detail. A result of the character type screening 1202 is written into character candidate information 1205, and character discrimination processing 1203 receives the result.

In the character discrimination processing 1203, a type of character that exists at a corresponding location in the binary image 1201 is determined utilizing the result of the character type screening 1202. If a character is discriminated, the result is written into character code information 1204. In the case where a character is not detected by the character discrimination processing 1203, 0 is written into the character code information 1204.

As described above, in the present embodiment, the character type screening processing 1202 is placed before the character discrimination processing 1203. Therefore, the number of times that the character discrimination processing 1203 is executed with a comparatively heavy calculation load, is reduced. In addition, the character type refining is carried out to some extent in the character type screening 1202, accordingly, optimal discrimination can be performed by the character discrimination processing 1203.

Figure 13:
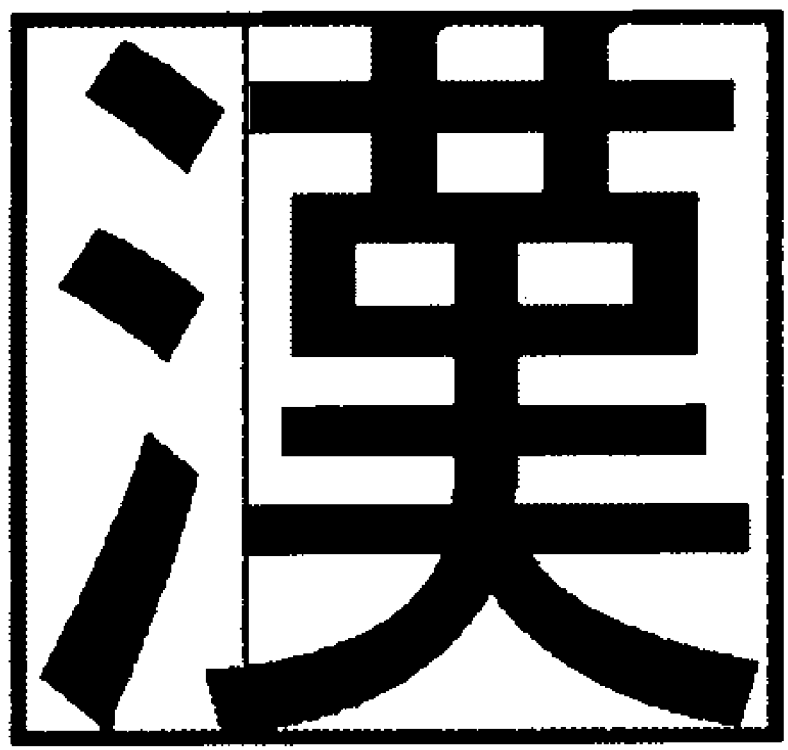
FIG. 13 is a view illustrating a concept of character type screening according to the second embodiment of the present invention.

Next, the character type screening processing 1202 will be described in detail. A basic concept in character type screening will be described with reference to FIG. 13. In typical characters, it can be considered that the pixel number of character colors in a rectangle circumscribing a character is within a specific range. In addition, as shown in FIG. 13, if a character region is divided, with respect to a certain character, it can be considered that the pixel numbers of character colors are within a specific range in each region. Therefore, a plurality of rectangles covering characters is prepared.

In consideration of a distribution of the pixel number in each rectangle, if character discrimination processing corresponding to that distribution is selected and executed, discrimination processing specialized to that distribution can be performed. In this manner, a learning load in the individual discrimination processing can be reduced, and discrimination can be carried out with higher precision.

Figure 14:
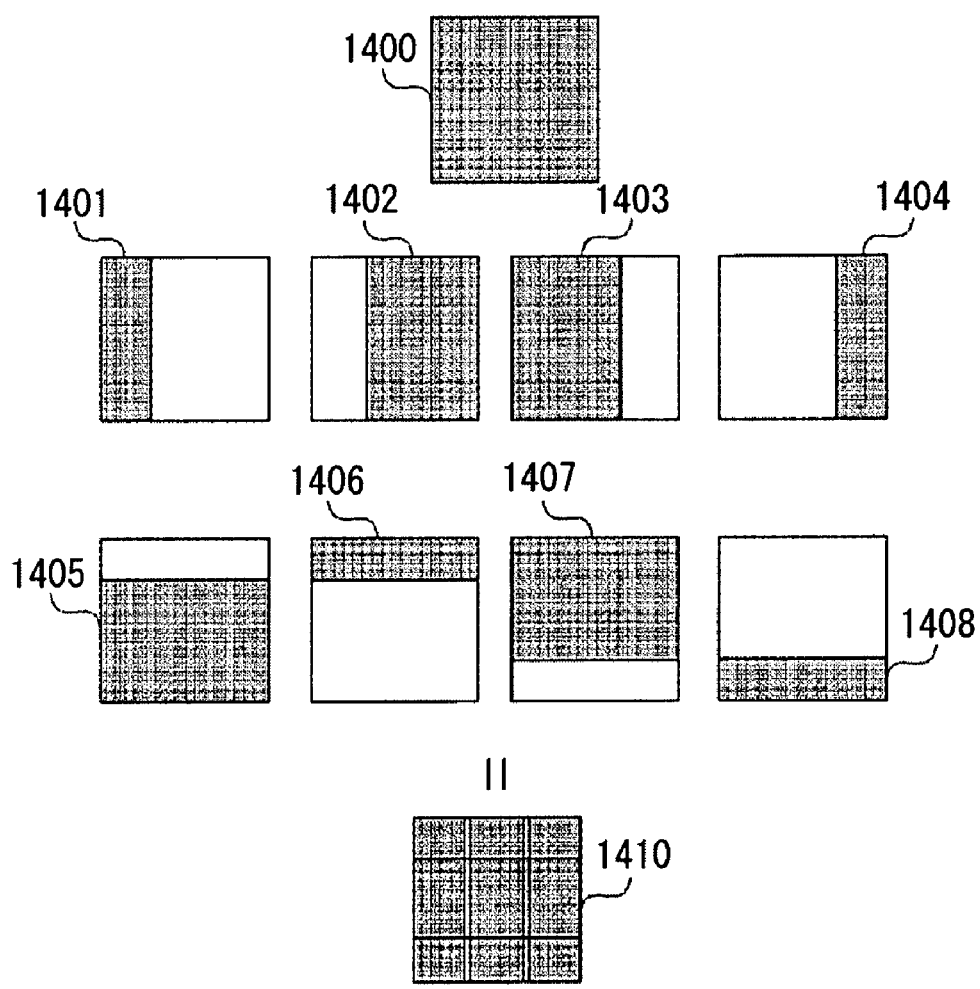
FIG. 14 is a diagram of arranging rectangles for use in the second embodiment of the present invention.

In the present embodiment, gray rectangles 1400 to 1408 arranged in FIG. 14 are employed. In FIG. 14, nine rectangles are individually arranged in order to clarify a duplication state. However, in actuality, these rectangles are laid out as shown in a rectangle 1410 in which thick frames are aligned and superimposed. The rectangles shown in FIG. 14 are provided to merely illustrate an example. According to an embodiment, it is necessary to change and select optimal rectangles according to character types to be identified such as Japanese kanji graphic characters or alphabetical letters.

The term "character type" used here does not refer to a specific character, but a set of characters. Namely, a plurality of characters is called a character type as a whole. However, it is a possible that the set includes only one character.

The character type in the character type screening 1202 is represented as a binary vector. Here, threshold values t0 to t8 are defined with respect to the rectangles 1400 to 1408. If the pixel number of character colors in rectangles exceeds the corresponding threshold value, "1" is assigned to the rectangle. Otherwise, "0" is assigned to the rectangle. The vector obtained by arranging these numbers "0" and "1" represents a character type.

For example, it is assumed that the total pixel number P within the rectangle 1400=400, and t0=132, t1=28, t2=96, t3=96, t4=28, t5=96, t6=28, t7=96, t8=28 as threshold values of the rectangles. Further, it is assumed that the pixel numbers of character colors in the rectangles 1400 to 1408 of an image to be discriminated are obtained as c0=132, c1=44, c2=88, c3=88, c4=44, c5=88, c6=44, c7=88, c8=44, respectively. In that case, a vector representing a character type is (0, 1, 0, 0, 1, 0, 1, 0, 1). The character candidate information 1205 in FIG. 12 is arranged in a two-dimensional array such that a character type vector in each point (x, y) of the binary image 1201 is defined as an (x, y) element of array.

Figure 15:
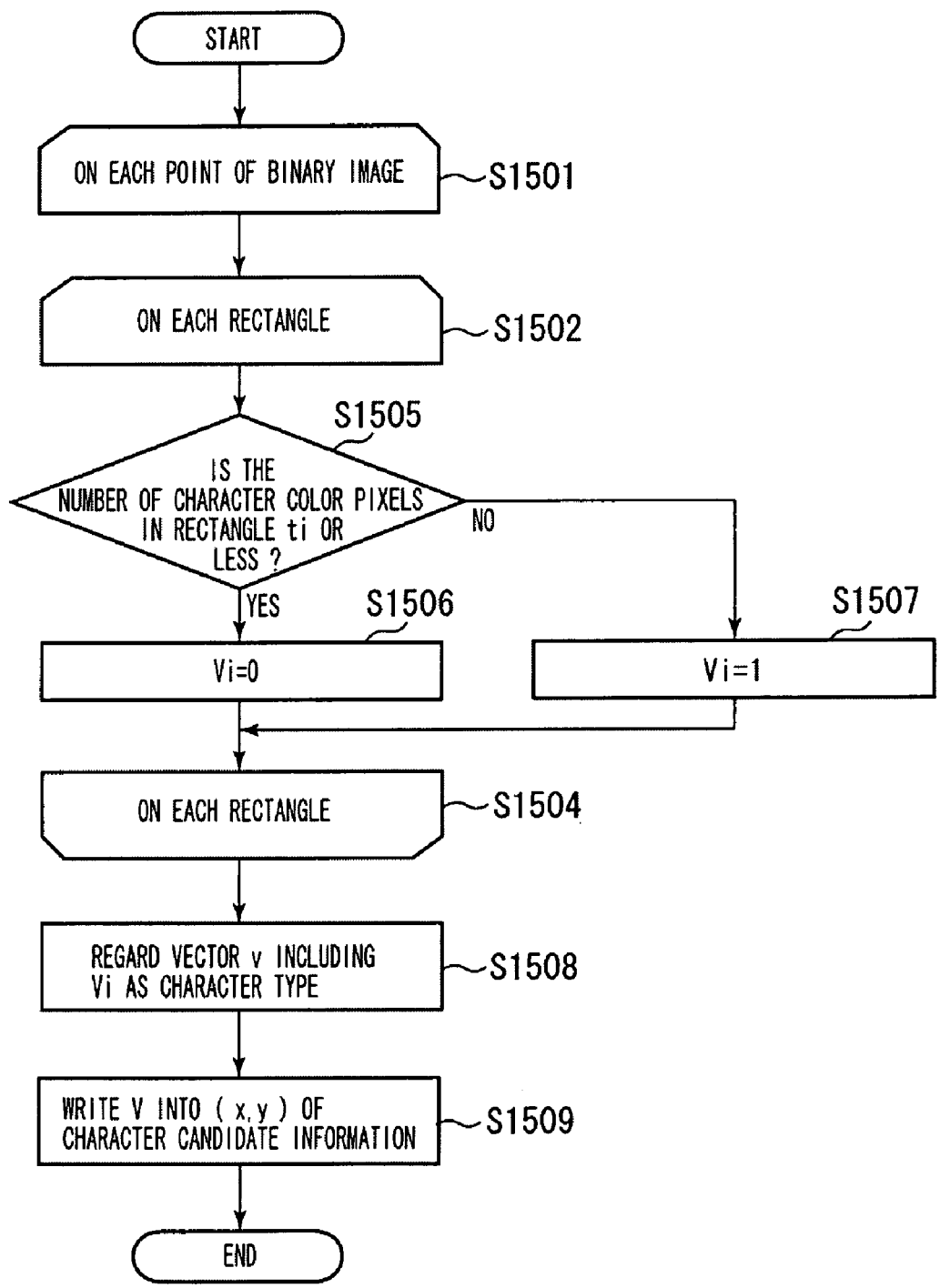
FIG. 15 is a flow chart illustrating operational procedures for character type screening according to the second embodiment of the present invention.

FIG. 15 is a flow chart illustrating processing of the character type screening processing 1202. First, the rectangle 1400 is defined as a 0-th rectangle; the rectangle 1401 is defined as a first rectangle; the rectangle 1402 is defined as a second rectangle; and the rectangles 1403 to 1408 are defined in the same manner. Then, in the relative coordinate from the left top point of the rectangle 1400, the left top point and the right bottom point of an i-th rectangle are defined as (xi0, yi0) and (xi1, yi1), respectively.

Execution of the character type screening 1202 begins at a loop from steps S1501 to 1502. In this loop, the CPU 100 repeats execution to each point (x, y) within the binary image 1201 of FIG. 12. In this loop, the CPU 100 further executes a loop from steps S1503 to S1504. In this loop, next step S1505, step S1506, or step S1507 is repeated while variable "i" is increased from "0" to "8".

In step S1505, the CPU 100 checks a pixel number "ci" of a character color in an i-th rectangle which is defined with a diagonal line connecting (x+xi0, y+yi0) and (x+xi1, y+yi1), and checks whether the pixel number is equal to or smaller than "t1". If the pixel number is equal to or smaller than "ti" (YES in step S1505), the process proceeds to step S1506. In step S1506, the CPU 100 substitutes "0" for a variable "vi". If the pixel number is greater than "t1" (NO in step S1505), the process proceeds to step S1507. In step S1507, the CPU 100 substitutes "1" for a variable "vi".

When execution of the loop from steps S1501 to 1502 has been completed, the CPU 100 generates a vector "v" in which vi (i=0 to 8) is arranged and defines this vector as a character type in step S1508. Then, in step S1509, the CPU 100 substitutes a vector "v" obtained in step S1508 for an (x, y) element of the character candidate information 1205.

Figure 16:
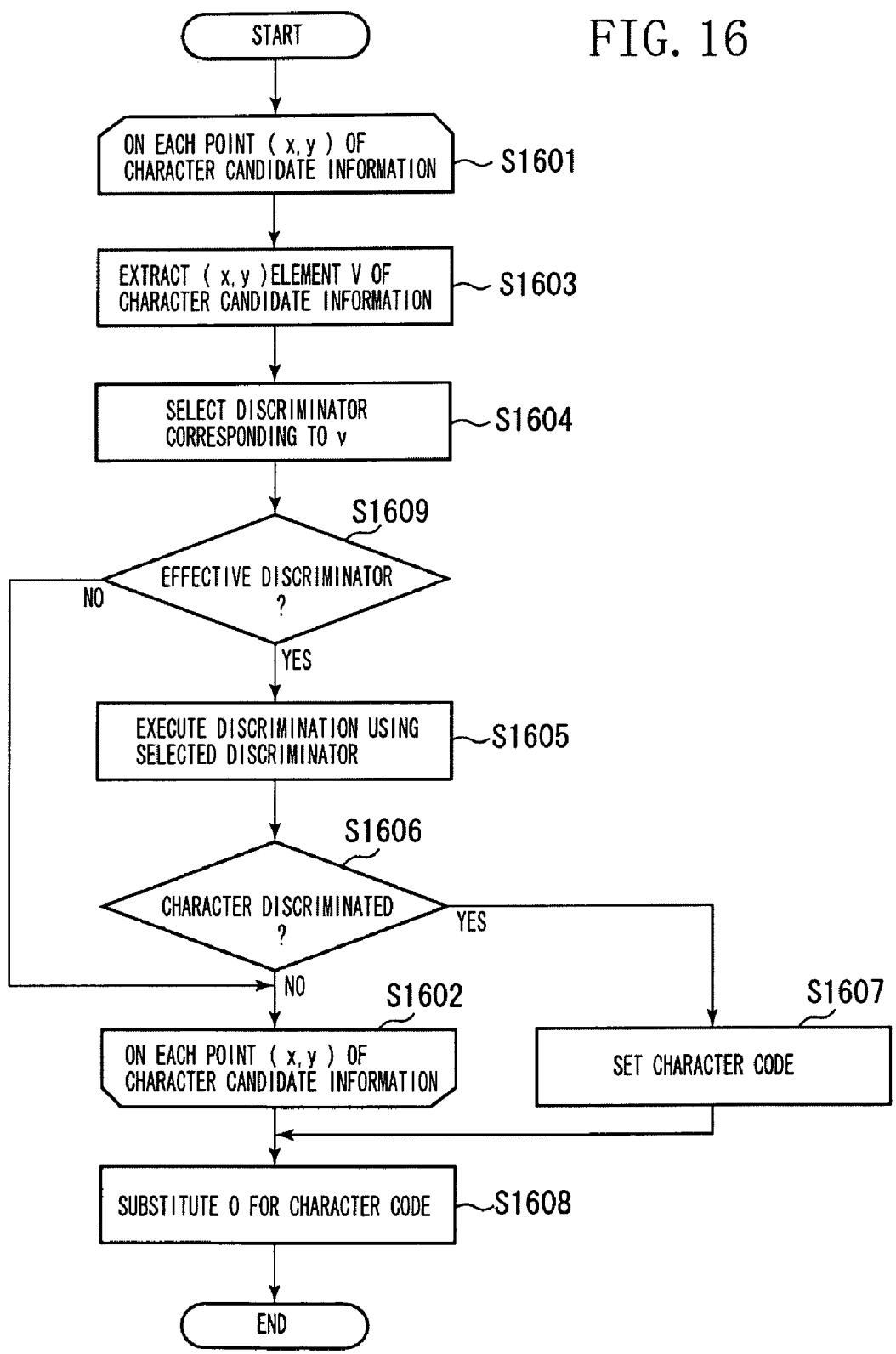
FIG. 16 is a flow chart illustrating operational procedures for character recognition according to the second embodiment of the present invention.

FIG. 16 shows a flow chart of the character discrimination processing 1203. First, the CPU 100 repeats a loop from step S1601 to step S1602 to each element (x, y) of the character candidate information 1205. In step S1603, the CPU 100 substitutes an (x, y) element of character candidate information 1205 for variable "v". In step S1604, the CPU 100 selects a discriminator corresponding to the variable "v".

In step S1604, a table such as a lookup table in which identifiers of discriminators are arranged to 512 values of character type vector "v" as illustrated in FIG. 17, and then, an discriminator is selected. In FIG. 17, the left side 9 columns indicate the values of a character type vector, and the identifiers of the corresponding discriminator are written on the right side. Where "none" is specified as a discriminator, it indicates that there is no effective discriminator corresponding thereto.

In step S1609, the CPU 100 determines whether the identifier of the selected discriminator in step S1604 is "none". In the case where the identifier is "none" (NO in step S1609), no effective discriminator is present. Therefore, the CPU 100 continues a loop from step S1601 to step S1602 without executing discrimination. In the case where the identifier is not "none" in step S1609 (YES in step S1609), process proceeds to step S1605. In step S1605, the CPU 100 executes character discrimination with the discriminator selected in step S1604, to an image within a rectangle which is defined with a diagonal line connecting (x, y) and (x+x01, y+y01) of the binary image 1201.

Then, in step S1606, the CPU 100 determines whether a character has been discriminated by executed discrimination. In the case where character discrimination is successful (YES in step S1606), the process exits from a loop from step S1601 to step S1602, and proceeds to step S1607. In step S1607, the CPU 100 substitutes the character code of the character detected by the discriminator for the character code information 1204. On the other hand, in the case where the determination result is negative (NO in step S1606), the CPU 100 continues a loop from step S1601 to step S1602.

In the case where a character cannot be discriminated in every point of the character candidate information 1205, the CPU 100 substitutes 0 for the character code information 1204 in step S1608. As a discriminator used in step S1605, for example, a general multilayered neural network is available. Further, a technique such as back propagation algorithm is available as a learning method for the multilayered neural network. Alternatively, other pattern recognition techniques such as support vector machine (SVM) are available.

In any case, recognition performance can be improved by preparing a different discriminator depending on a character type vector. This is because each discriminator needs to learn only the character represented by the same character type vector. In this manner, each discriminator needs to learn only the pattern in a limited feature space, and a leaning load in individual discriminators is reduced.

The term "different discriminators" used here can be discriminators using different techniques or can be discriminators using the same technique with different parameters. Alternatively, as shown in FIG. 17, the same discriminator can be used in a plurality of character type vectors.

As described above, according to the configuration of the present embodiment, a character candidate position can be refined by checking the pixel number of a character color within a figure that arranged in a predetermined layout. As a result, execution of the subsequent character discrimination processing is restrained, and the entire processing speed can be increased.

In addition, character recognition processing can be changed by checking a distribution of the pixel numbers of character colors in each figure so that discrimination precision is improved. While the present embodiment assumes that the character size is constant, a variety of sizes of characters can be recognized by way of reducing a binary image as illustrated in the first embodiment.

According to the embodiments described above, a target region for executing pattern detection can be advantageously and efficiently refined.

The present invention includes a case in which a system such as OS running on a computer carries out part or all of actual processing based on an instruction of the computer read program code, and functions of the embodiments described previously are achieved by the process.

Further, the present invention also includes a case in which the functions of the embodiments described previously are realized by the process of a CPU which is mounted to the extension board or extension unit based on an instruction of the program code read from a storage medium and written in a memory which is equipped on the extension board or extension unit.

As storage mediums for supplying a program code, for example, a Floppy® disk, a hard disk, an optical disk, a magneto-optical disk, a CD, a DVD, a magnetic tape, a non-volatile memory card, a ROM or the like can be employed.

Further, the present invention includes a case where in an image input device, an information storage device, or an apparatus in which these devices are combined with each other, a CPU installed in both or either of the devices carries out part or all of actual process, thereby the functions of the embodiments described previously are achieved.

As the image input device as described above, there can be used: cameras or scanners utilizing a variety of CCDs such as a video camera, a digital camera, and a monitoring camera; and an image input device in which an analog image from an analog image input device is converted to a digital image by AD conversion. Equipment such as an external hard disk or a video recorder can be utilized as the information storage device.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-346260 filed Dec. 22, 2006, which is hereby incorporated by reference herein in its entirety.

What is claimed is:

1. A method comprising:
   determining a ratio of pixels having a first attribute in a first region of an image to generate a first determination result;
   determining a ratio of pixels having a second attribute in a second region of the image to generate a second determination result, wherein the second region is arranged inside the first region, and the first and second regions are rotationally symmetric figures having coincident centers;
   determining whether human face images can exist in the vicinity of the first region based on the first determination result and the second determination result; and
   detecting a human face image in the vicinity of the first region when it is determined that the human face image can exist.

2. The method according to claim 1, wherein the first determination result is generated based on whether a ratio of pixels having the first attribute is within a first range.

3. The method according to claim 2, wherein the second determination result is generated based on whether a ratio of pixels having the second attribute is within a second range.

4. The method according to claim 1, wherein the first region is a first rectangular region, and wherein the second region is included in the first rectangular region and is a second rectangular region having sides parallel to the first rectangular region.

5. The method according to claim 1, wherein attributes of the pixels are pixel chromaticity, luminance, hue, chroma saturation, or brightness.

6. The method according to claim 1, further comprising generating cumulative images of the image, wherein, in the first and second ratio determination, a ratio of pixels is determined by using the cumulative images.

7. The method according to claim 1, wherein the first attribute and the second attribute are associated with a skin color and the human face image.

8. A method comprising:
   determining a ratio of pixels having a predetermined attribute within each figure with respect to one or more figures that include a rotationally symmetric figure in an image;
   determining whether human face images can exist in the vicinity of the figure, based on a result of the ratio determination; and
   detecting a human face image and an image obtained by rotating the human face image in a portion of the image where it is determined that the human face image can exist.

9. The method according to claim 8, wherein, in the ratio determination, it is determined whether a ratio of pixels having the attribute is within a predetermined range.

10. The method according to claim 8, wherein said one or more figures are two or more figures that are arranged in predetermined relative positions.

11. The method according to claim 8, wherein said one or more figures are two or more rotationally symmetric figures having coincident centers.

12. The method according to claim 8, wherein attributes of the pixels are pixel chromaticity, luminance, hue, chroma saturation, or brightness.

13. The method according to claim 8, further comprising generating cumulative images of the image, wherein a ratio of pixels is determined by using the cumulative images.

14. An apparatus comprising:
   a first ratio determination unit configured to determine a ratio of pixels having a first attribute in a first region of an image;
   a second ratio determination unit configured to determine a ratio of pixels having a second attribute in a second region of the image that is arranged inside the first region, and the first and second regions are rotationally symmetric figures having coincident centers;
   a determination unit configured to determine whether human face images can exist in the vicinity of the first region based on determination results of the first and second ratio determination units; and
   a detection unit configured to detect a human face image in the vicinity of the first region when it is determined that the human face image can exist.

15. The apparatus according to claim 14, wherein the first ratio determination unit is configured to determine a ratio of pixels having a skin color attribute in the first region of the image, and the second ratio determination unit is configured to determine a ratio of pixels having the skin color attribute in the second region of the image; and
   wherein the determination unit, when the ratio of pixels having the skin color attribute in the first region is smaller than a first threshold value and the ratio of pixels having the skin color attribute in the second region is greater than a second threshold value, determines whether a face pattern can exist in a vicinity of the first region.

16. The apparatus according to claim 15, wherein the determination unit performs a face detection in the vicinity of the first region when it is determined by the determination unit that a face pattern can exist in a vicinity of the first region.

17. An apparatus comprising:
   a ratio determination unit configured to determine a ratio of pixels having a predetermined attribute within each figure with respect to one or more figures that include a rotationally symmetric figure in an image;
   a determination unit configured to determine whether human face images can exist in the vicinity of the figure based on a result of the ratio determination; and
   a detection unit configured to detect a human face image and an image obtained by rotating the human face image in a portion of the image where it is determined that the human face image can exist.

* * * * *